(12) United States Patent
Sharma (10) Patent No.: US 10,691,557 B1
(45) Date of Patent: Jun. 23, 2020

(54) BACKUP FILE RECOVERY FROM MULTIPLE DATA SOURCES

(71) Applicant: EMC Corporation, Hopkinton, MA (US)

(72) Inventor: Anupam Sharma, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 231 days.

(21) Appl. No.: 15/192,826

(22) Filed: Jun. 24, 2016

(51) Int. Cl.
  *G06F 11/14* (2006.01)
  *G06F 16/27* (2019.01)

(52) U.S. Cl.
  CPC .......... *G06F 11/1469* (2013.01); *G06F 16/27* (2019.01)

(58) Field of Classification Search
  None
  See application file for complete search history.

(56) References Cited

U.S. PATENT DOCUMENTS

| | | | | |
|---|---|---|---|---|
| 2002/0078461 A1* | 6/2002 | Boykin | ............ | H04N 21/23106 725/87 |
| 2003/0204605 A1* | 10/2003 | Hudson | ............ | D01D 5/423 709/228 |
| 2007/0208748 A1* | 9/2007 | Li | ............ | G06F 17/30206 |
| 2007/0220214 A1* | 9/2007 | Sandrock-Grabsky | | G06F 11/1458 711/153 |
| 2010/0293329 A1* | 11/2010 | Wang | ............ | G06F 11/1469 711/112 |
| 2013/0080392 A1* | 3/2013 | Sawdon | ............ | G06F 11/1451 707/646 |
| 2014/0310247 A1* | 10/2014 | Vijayan | ............ | G06F 11/1469 707/679 |
| 2015/0161163 A1* | 6/2015 | Cypher | ............ | G06F 11/1435 707/610 |
| 2016/0337426 A1* | 11/2016 | Shribman | ............ | H04L 65/4084 |

* cited by examiner

*Primary Examiner* — Taelor Kim
*Assistant Examiner* — Eddy Cheung
(74) *Attorney, Agent, or Firm* — Dergosits & Noah LLP; Todd A. Noah (57) ABSTRACT

Backup file recovery from multiple data sources is described. A system determines whether each of multiple data sources stores a corresponding copy of a backup file associated with a data object, in response to receiving a request to recover the backup file associated with the data object. The system allocates multiple portions of the backup file to corresponding multiple data streams, if each of the multiple data sources stores the corresponding copy of the backup file associated with the data object. The system recovers the backup file by concurrently recovering the multiple data streams from the corresponding multiple data sources.

15 Claims, 5 Drawing Sheets

| Time Period 1 | Time Period 2 | Time Period 3 | Time Period 4 | Time Period 5 | Time Period 6 | Time Period 7 | Time Period 8 | Time Period 9 | Time Period 10 |
|---|---|---|---|---|---|---|---|---|---|
| Recover File A | | | | Recover File B | | Recover File C | | Recover File D | |

300

| Time Period 1 | Time Period 2 | Time Period 3 | Time Period 4 | Time Period 5 | Time Period 6 | Time Period 7 | Time Period 8 | Time Period 9 | Time Period 10 |
|---|---|---|---|---|---|---|---|---|---|
| Recover File A | | | Recover File D | | | | | | |
| Recover File B | Recover File C | | | | | | | | |

302

| Time Period 1 | Time Period 2 | Time Period 3 | Time Period 4 | Time Period 5 | Time Period 6 | Time Period 7 | Time Period 8 | Time Period 9 | Time Period 10 |
|---|---|---|---|---|---|---|---|---|---|
| Recover File A | | Recover File B | | Recover File C | | | | | |
| Recover File D | | | | | | | | | |

BACKUP FILE RECOVERY FROM MULTIPLE DATA SOURCES

BACKGROUND

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup/restore application to execute a restore operation to restore a copy of the corresponding backup files for that state to the data object.

A data object may be stored on a storage array, which is a disk storage system that includes multiple disk drives. Unlike a disk enclosure, a storage array has cache memory and advanced functionality, such as virtualization and Redundant Array of Independent Disks (RAID). A data protection administrator may manage a backup/restore application to create backups files of data objects and store the backup files of data objects on multiple storage arrays.

DETAILED DESCRIPTION

Multiple data sources that store backup files of data objects may store their own copy of the same backup file for the same data object. For example, a backup/restore application creates a primary copy of a backup file for a data object, stores the primary copy to a first disk, creates a clone copy of the primary copy, and stores the clone copy to a second disk. When a backup/restore application recovers a backup file for a data object to restore the data object to a previous state, the backup/restore application recovers a copy of the backup file from only one of the data sources that stores its own copy of the backup file. Continuing the previous example, the backup/restore application either recovers the primary copy of the backup file from the first disk or recovers the clone copy of the backup file from the second disk. The time that is required to recover a copy of a backup file from a data source is a significant portion of the time required to respond to a user's request to restore a data object to a previous state.

Embodiments herein enable backup file recovery from multiple data sources. A system receives a request to recover a backup file associated with a data object, and determines whether each of multiple data sources stores their own copy of the backup file. If each of the multiple data sources stores their own copy of the backup file, the system allocates multiple portions of the backup file to corresponding multiple data streams, and recovers the backup file by concurrently recovering the multiple data streams from their corresponding multiple data sources.

For example, a backup/restore application receives a request to recover a backup file that includes a laptop computer's databases. The backup/restore application determines whether both of two storage array disks stores their own copy of the requested backup file. If both of the two storage array disks stores their own copy of the requested backup file, the backup/restore application allocates the first half of the backup file to the first of two data streams and allocates the second half of the backup file to the second of two data streams. The backup/restore application recovers the requested backup file by concurrently recovering the two data streams from the two corresponding storage array disks, which may recover the requested backup file twice as fast as the typical recovery of the requested backup file via a single data stream from a single data source. If the backup/restore application determines that each of three rage array disks store their own copy of the requested backup file, the backup/restore application allocates the requested backup file to three data streams that are concurrently recovered from the three storage array disks in a recovery that can be three times faster than the typical recovery of the requested backup file via a single data stream from a single data source.

Figure 1:
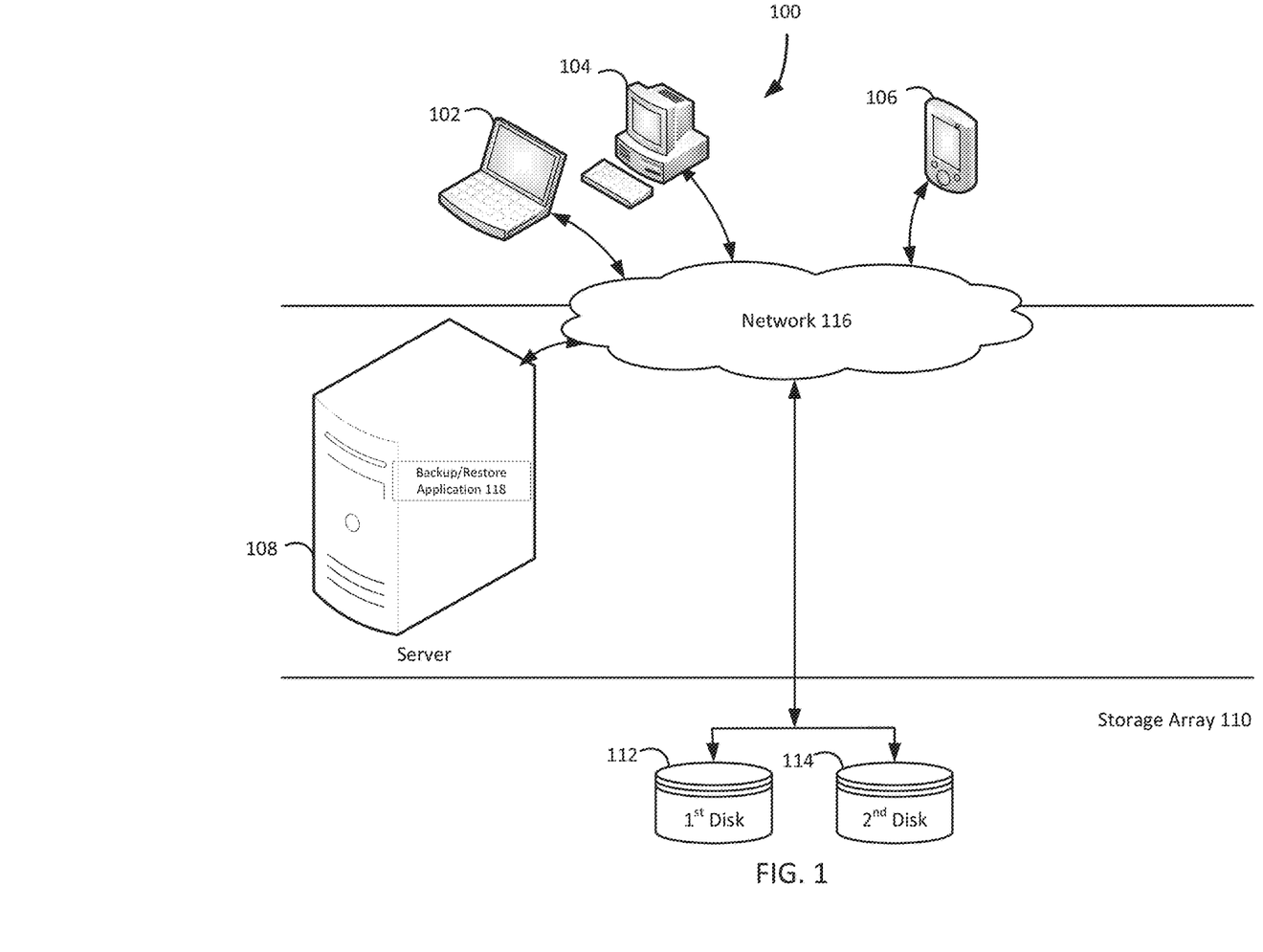
FIG. 1 illustrates a block diagram of an example system for backup file recovery from multiple data sources, under an embodiment.

FIG. 1 illustrates a diagram of a system for backup file recovery from multiple data sources, under an embodiment. As shown in FIG. 1, a system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a server 108, and a storage array 110 that may be provided by a hosting company. Although FIG. 1 depicts the first client 102 as a laptop computer 102, the second client 104 as a personal computer 104, and the third client 106 as a personal digital assistant 106, each of the clients 102-106 may be any type of computer, such as a server. The storage array 110 includes a first disk 112 and a second disk 114. The clients 102-106, the server 108, and the storage array 110 communicate via a network 116. Although FIG. 1 depicts the system 100 with three clients 102-106, one server 108, one storage array 110, two disks 112-114, and one network 116, the system 100 may include any number of clients 102-106, any number of servers 108, any number of storage arrays 110, any number of disks 112-114, and any number of networks 116. The clients 102-106 and the server 108 may each be substantially similar to the system 500 depicted in FIG. 5 and described below.

The server 108, which may be referred to as a backup server 108, includes a backup/restore application 118 that creates backup files for data objects for the clients 102-106, and execute a rollback based on the backup files. The backup/restore application 118 may provide centralized administration, such as scheduling, monitoring, and managing backup operations and backup files. The backup/restore application 118 can enable the storing of backup operation schedules, client policies, and client configurations. The backup/restore application 118 may provide a unique interface to the clients 102-106 during login, and assist the backup server 108 in authenticating and registering the clients 102-106. The backup/restore application 118 can send backup/restore work orders to the clients 102-106, which may receive and process the work orders to start a backup or restore operation. The backup/restore application 118 maintains a local database of all processes that execute on the backup server 108. The backup/restore application 118 executes server-side processes for a system administrator's graphical management console, which may enable the system administrator to use command line interface tools for queries. For example, a system administrator identifies the clients 102-106 registered with the backup server 108.

Although FIG. 1 depicts the backup/restore application 118 residing completely on the backup server 108, the backup/restore application 118 may reside in any combination of partially on the backup server 108 and partially on the clients 102-106, such as by residing as data management applications on the clients 102-106. Even though the following paragraphs describe EMC Corporation's Avamar® backup/restore application and EMC Corporation's NetWorker® backup/restore application as examples of the backup/restore application 118, the backup/restore application 118 may be any other backup/restore application which provides the backup/restore functionalities described in the Background section.

The backup/restore application 118 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems can be deployed in an integrated solution with EMC Corporation's Data Domain® systems for high-speed backup and recovery of specific data types.

The backup/restore application 118 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

The backup/restore application 118 receives a request to recover a backup file associated with a data object. For example, the backup/restore application 118 receives a request to recover the backup file, which includes the databases of the laptop computer 102, which corresponds to a user selected checkpoint. A checkpoint is a point in time associated with a state of a data object, typically a point in time when a backup file was created. A backup file can be a full backup file that includes all of a data object or the parts of the data object that are used, or a backup file can be an incremental backup file that includes only changes made to a data object since a selected time, such as a previous backup of the data object.

After receiving a request to recover a backup file, the backup/restore application 118 determines whether each of multiple data sources stores a corresponding copy of the requested backup file. For example, the backup/restore application 118 reads a backup catalog previously created by the backup/restore application 118 to determine whether each of the two storage array disks 114 and 116 stores their own copy of the requested backup file. A backup catalog may include information such as file names, internal file identifiers, save set offsets, client attributes, client identifiers, data set records, and volume records. The backup/restore application 118 can browse and fetch from a backup catalog to identify a backup file that corresponds to the user's checkpoint, and identify which volumes store their own copy of this backup file.

If each of multiple data sources stores its own copy of a requested backup file, the backup/restore application 118 allocates multiple portions of the requested backup file to corresponding multiple data streams. In a simplified example, the backup/restore application 118 allocates approximately the first half of the requested backup file to the first of two data streams and allocates the approximately second half of the requested backup file to the second of two data streams because each of the two storage array disks 112 and 114 stores their own copy of the requested backup file. The amount of the requested backup file that the backup/restore application 118 allocates to each data stream is approximately half because the requested backup file may not be divisible into two exact halves. Each portion of the backup file may include data files, which may be of variable sizes, or data blocks, which are typically the same size. This simplified example describes the backup/restore application 118 allocating two portions of the requested backup file to two data streams because two data sources store their own copy of the requested backup file. However, the backup/restore application 118 may allocate any number of portions of the requested backup file to the same number of data streams provided that the number of portions and the number of data streams equals the number of data sources that store their own copy of the requested backup file. For example, the backup/restore application 118 allocates three portions of the requested backup file to three data streams if three data sources store their own copy of the requested backup file.

Figure 2:
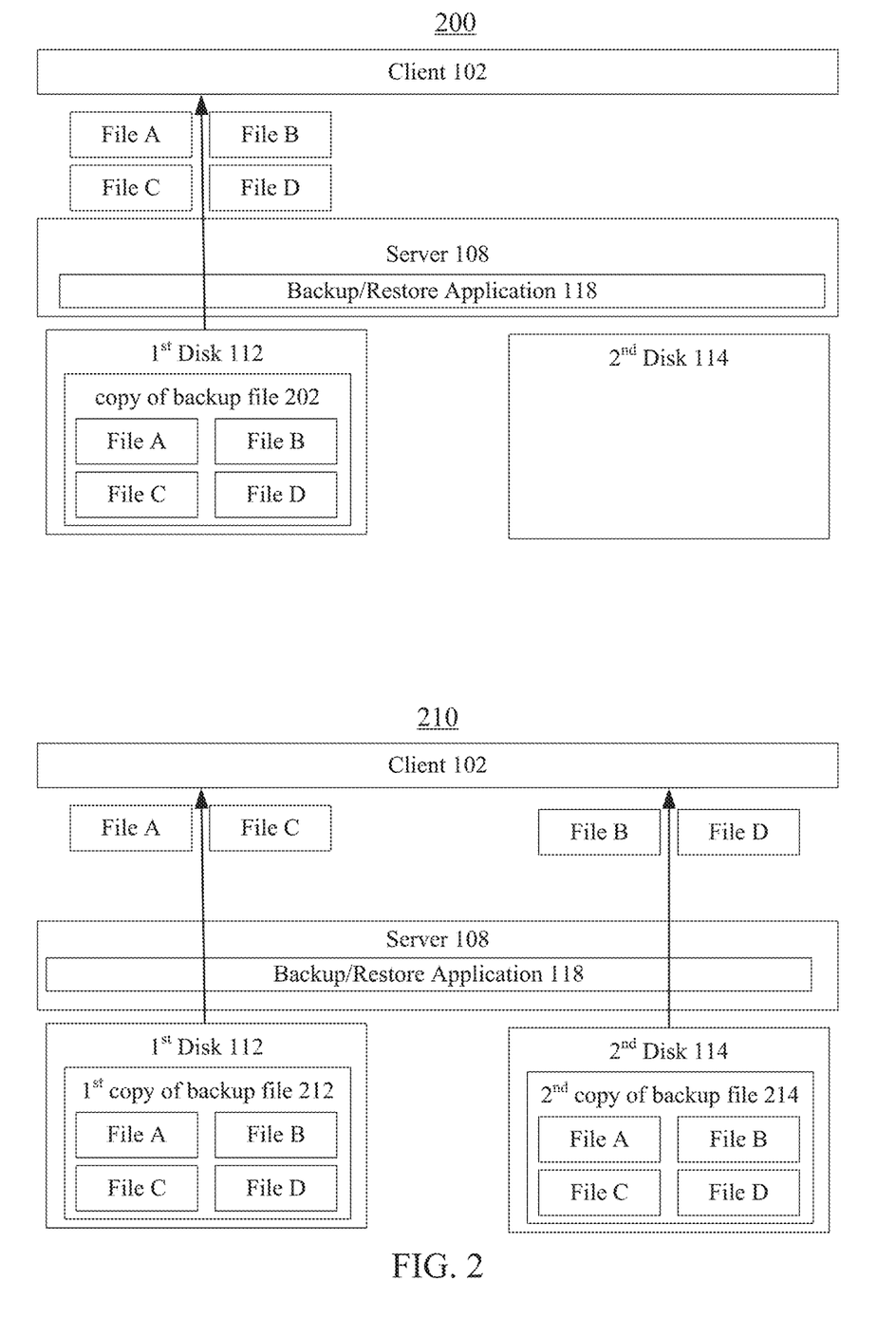
FIG. 2 illustrates block diagrams of example systems for backup file recovery from multiple data sources, under an embodiment.
Figure 3:
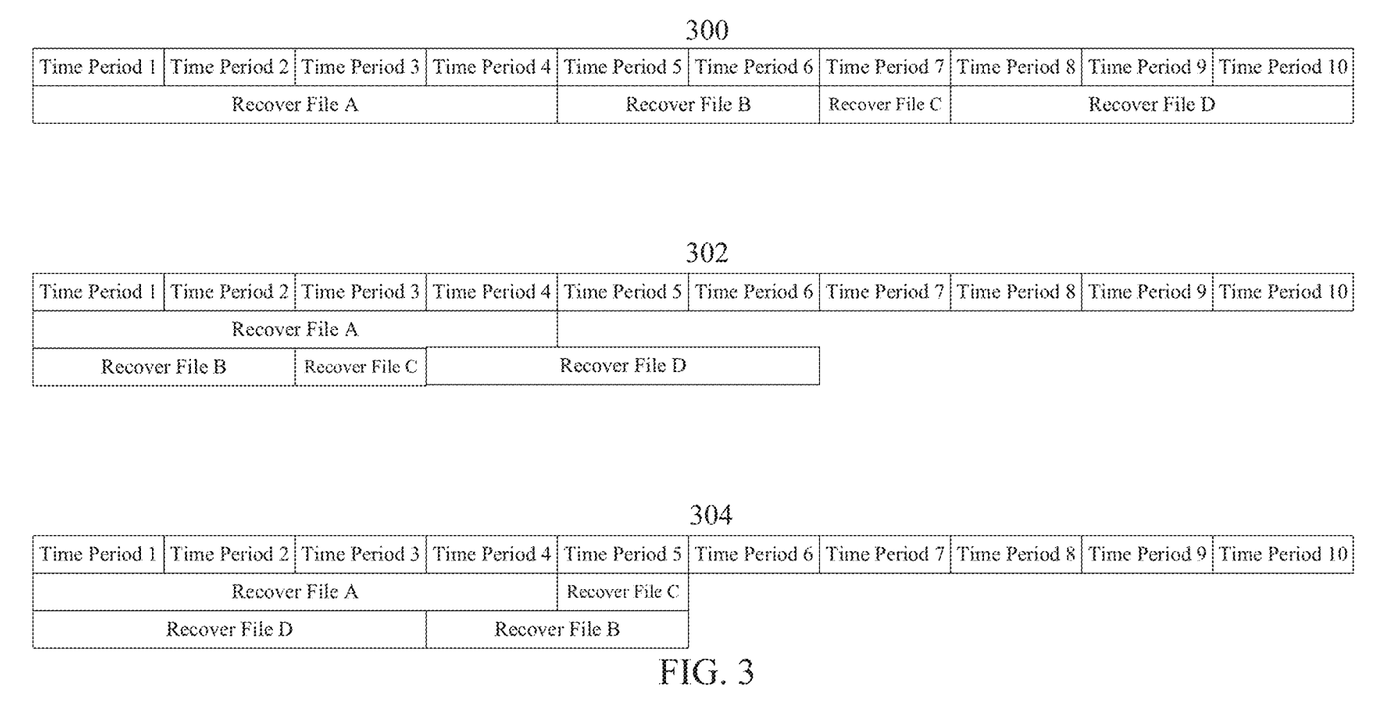
FIG. 3 illustrates block diagrams of example timelines for backup file recovery from multiple data sources, under an embodiment.

Although the simplified example describes the backup/restore application 118 allocating the first half of the backup file to the first of two data streams and allocates the second half of the backup file to the second of two data streams, the backup/restore application 118 may use other processes to allocate portions of the backup file to data streams. For example, the backup/restore application 118 may allocate the first part of the requested backup file to the first of two data streams, allocate the second part of the requested backup file to the second of two data streams, allocate the third part of the requested backup file to the first data stream, allocate the fourth part of the requested backup file to the second data stream, and continue allocating odd-numbered parts of the requested backup file to the first data stream and even-numbered parts of the requested backup file to the second data stream until all parts of the requested backup file are allocated. An example of allocation based on alternating parts of the requested backup file is depicted in FIG. 2 and described below in reference to FIG. 2. In this example of allocation based on alternating parts of the requested backup file, each part of the requested backup file may be a data file or each part of the requested backup file may be a data block. In another example, the backup/restore application 118 may allocate the largest part of the requested backup file to a first data stream, allocate the next largest part of the requested backup file to a second data stream, and continue allocating parts of the requested backup file based on the descending size order of parts of the requested backup file until allocating the smallest part of the requested backup file to the first data stream or the second data stream. An example of allocation based on the descending size order of parts of the requested backup file is depicted in FIG. 3 and described below in reference to FIG. 3.

After allocating portions of a requested backup file to multiple data streams, the backup/restore application 118 recovers the requested backup file by concurrently recovering the multiple data streams from multiple data sources. For example, the backup/restore application 118 recovers the requested backup file by using two recovery processes to concurrently browse and fetch from the backup catalog to concurrently recover the first data stream for the first half of the requested backup file from the storage array disks 112 and recover the second data stream for the second half of the requested backup file from the storage array disks 114. After recovering the requested backup file to the requesting client 102, the backup/restore application 118 uses the recovered backup file to restore the corresponding data object in the requesting client 102 to the state of this data object at the time of the creation of the requested backup file. By using two recovery processes to browse and fetch from the backup catalog, the backup/restore application 118 can browse and fetch from the backup catalog twice as fast as a single recovery process typically browses and fetches from the backup catalog. In this example, the backup/restore application 118 can recover the requested backup file twice as fast as the typical recovery of the requested backup file via a single data stream from a single data source because each of the two data streams is recovering only approximately half the data compared to the data recovered by the typical recovery via a single data stream from a single data source. If the backup/restore application 118 determines that each of three storage array disks store their own copy of the requested backup file, the backup/restore application 118 allocates the requested backup file to three data streams that are concurrently recovered from the three storage array disks in a recovery that can be three times faster than the typical recovery of the requested backup file via a single data stream from a single data source.

If each of multiple data sources do not store its own copy of a requested backup file, the backup/restore application 118 recovers the requested backup file from a single data source of multiple data sources. For example, the backup/restore application 118 recovers the requested backup file from the storage array disk 114 because the storage array disk 114 is the only data source for the requested backup file.

FIG. 2 illustrates a block diagram of example systems 200 and 210 for backup file recovery from multiple data sources, under an embodiment. In the system 200, the client 102 requests recovery of a backup file based on a user-selected checkpoint, the backup/restore application 118 identifies a specific backup file based on the checkpoint, and determines that the $1^{st}$ disk 112 stores a copy of this backup file 202 and that the $2^{nd}$ disk 114 stores no copy of this backup file. Then the backup/restore application 118 recovers the copy of the backup file 202 to the client 102 by recovering the parts of the backup file, which include the data files A, B, C, and D, via a single data stream from a single data source, the $1^{st}$ disk 112. Typical backup/restore applications would recover the requested backup file to the requesting client 102 via a single data stream recovered from a single data source, the $1^{st}$ disk 112, even if the $2^{nd}$ disk 114 also stored a copy of the requested backup file.

In the system 210, the client 102 requests recovery of a backup file based on a user-selected checkpoint, the backup/restore application 118 identifies a specific backup file based on the checkpoint, and determines that the $1^{st}$ disk 112 stores a $1^{st}$ copy of this backup file 212 and that the $2^{nd}$ disk 114 stores a $2^{nd}$ copy of this backup file 214. Then the backup/restore application 118 recovers the requested backup file to the client 102 by recovering the portion of the backup file which include the data files A and C via a first data stream from the $1^{st}$ disk 112 while concurrently recovering the portion of the backup file which include the data files B and D via the second data stream from the $2^{nd}$ disk 114. In the system 210, the backup/restore application 118 can recover the requested backup file twice as fast as the typical recovery of the requested backup file via a single data stream from a single data source.

FIG. 3 illustrates a block diagram of example timelines 300, 302, and 304 for backup file recovery from multiple data sources, under an embodiment. The timeline 302 depicts that the recovery of the data file A requires 4 time periods, which are the time periods 1 through 4, the recovery of the data file B requires 2 time periods, which are the time periods 5 through 6, the recovery of the data file C requires 1 time period, which is the time period 7, and the recovery of the data file D requires 3 time periods, which are the time periods 8 through 10. Since the timeline 302 depicts recovery of a backup file via a single data stream from a single data source, the recovery of the data files A, B, C, and D requires a total of 10 time periods.

In contrast, the timeline 304 depicts recovery of a backup file via two data streams from two data sources. Therefore, the timeline 304 depicts that the recovery of the data file A via the first of two data streams requires 4 time periods, which are the time periods 1 through 4, while the concurrent recovery of the data file B via the second of two data streams requires 2 time periods, which are the time periods 1 through 2. At the end of time period 2, the first data stream is still busy recovering the data file A while the second data stream has completed recovery of the data file B. Therefore, since only the second data stream is available to recover another data file, the second data steam recovers the data file C, which requires 1 time period, the time period 3. At the end of time period 3, the first data stream is still busy recovering the data file A while the second data stream has completed recovery of the data file C. Therefore, since only the second data stream is available to recover another data file, the second data steam recovers the data file D, which requires 3 time periods, the time periods 4 through 6. At the end of time period 4, the first data stream has completed recovery of the data file A while the second data stream is still busy recovering the data file D. Since the requested backup file includes no more data files to recover, the first stream does not recover any more data files. At the end of time period 6, the second data stream has completed recovery of the data file D, which is the last data file to be recovered for the requested backup file. In contrast to the single stream recovery from a single data source that is depicted in the timeline 302 and that required 10 time periods, the two stream recovery from two data sources that is depicted in the timeline 304 required only 6 time periods, a 40% faster recovery than the recovery that required 10 time periods.

The backup/restore application 118 can further optimize recovery time by allocating the largest part of the requested backup file to a first data stream, allocating the next largest part of the requested backup file to a second data stream, and continue allocating parts of the requested backup file based on the descending size order of parts of the requested backup file until allocating the smallest part of the requested backup file to the first data stream or the second data stream. The backup/restore application 118 can determine the relative sizes of the data files in the requested backup file by browsing and fetching from the backup catalog. The timeline 306 depicts that the recovery of the largest data file A via the first of two data streams requires 4 time periods, which are the time periods 1 through 4, while the concurrent recovery of the next largest data file D via the second of two data streams requires 3 time periods, which are the time periods 1 through 3. At the end of time period 3, the first data stream is still busy recovering the largest data file A while the second data stream has completed recovery of the next largest data file D. Therefore, since only the second data stream is available to recover another data file, the second data steam recovers the next to the next largest data file B, which requires 2 time periods, the time period 4 through 5. At the end of time period 4, the second data stream is still busy recovering the data file B while the first data stream has completed recovering the largest data file A. Therefore, since only the first data stream is available to recover another data file, the first data steam recovers the smallest data file C, which requires 1 time period, the time period 5. At the end of time period 5, the first data stream has completed recovery of the data file C while the second data stream has completed recovery of the data file B. Since the requested backup file includes no more data files to recover, the two data streams do not recover any more data files. In contrast to the single stream recovery from a single data source that is depicted in the timeline 302 and that required 10 time periods, the optimized two stream recovery from two data sources that is depicted in the timeline 306 required only 5 time periods, a 50% faster recovery than the recovery that required 10 time periods, and a 16.66% faster recovery than the non-optimized recovery from two data sources that required 6 time periods.

Figure 4:
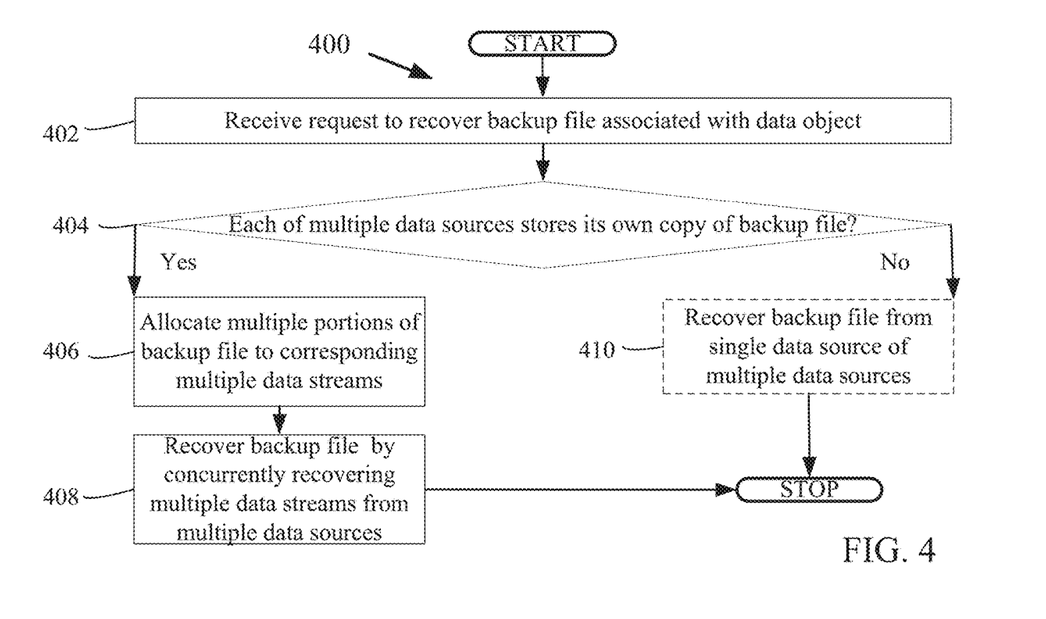
FIG. 4 is a flowchart that illustrates a method of backup file recovery from multiple data sources, under an embodiment.

FIG. 4 is a flowchart that illustrates a method for backup file recovery from multiple data sources, under an embodiment. Flowchart 400 illustrates method acts illustrated as flowchart blocks for certain steps involved in and/or between the clients 102-106 and/or the server 108 of FIG. 1.

A system receives a request to recover a backup file associated with a data object, block 402. For example, the backup/restore application 118 receives a request to recover a backup file that includes the databases of the laptop computer 102.

After receiving a request to recover a backup file, a system determines whether each of multiple data sources stores a corresponding copy of the requested backup file, block 404. For example, the backup/restore application 118 determines whether each of the two storage array disks 114 and 116 stores their own copy of the requested backup file. If multiple data sources store their own copy of the requested backup file, the flowchart 400 continues to block 408 to allocate portions of the requested backup file to multiple data streams. If multiple data sources do not store their own copy of the requested backup file, the flowchart 400 proceeds to block 410 to recover a copy of the requested backup file from a single data source.

If each of multiple data sources stores its own copy of a requested backup file, a system allocates multiple portions of the requested backup file to corresponding multiple data streams block 406. For example, the backup/restore application 118 allocates the first half of the requested backup file to the first of two data streams and allocates the second half of the requested backup file to the second of two data streams because each of the two storage array disks 112 and 114 stores their own copy of the requested backup file.

After allocating portions of a requested backup file to multiple data streams, a system recovers the requested backup file by concurrently recovering the multiple data streams from multiple data sources, block 408. For example, the backup/restore application 118 recovers the requested backup file by concurrently recovering the two data streams from the two storage array disks 112 and 114, which may be a recovery of the requested backup file that is twice as fast as the typical recovery of the requested backup file via a single data stream from a single data source. Then the flowchart 400 terminates.

If each of multiple data sources does not store its own copy of a requested backup file, a system recovers the requested backup file from a single data source of multiple data sources, block 410. For example, the backup/restore application 118 recovers the requested backup file from the storage array disk 114.

Although FIG. 4 depicts the blocks 402-410 occurring in a specific order, the blocks 402-410 may occur in another order. In other implementations, each of the blocks 402-410 may also be executed in combination with other blocks and/or some blocks may be divided into a different set of blocks.

Figure 5:
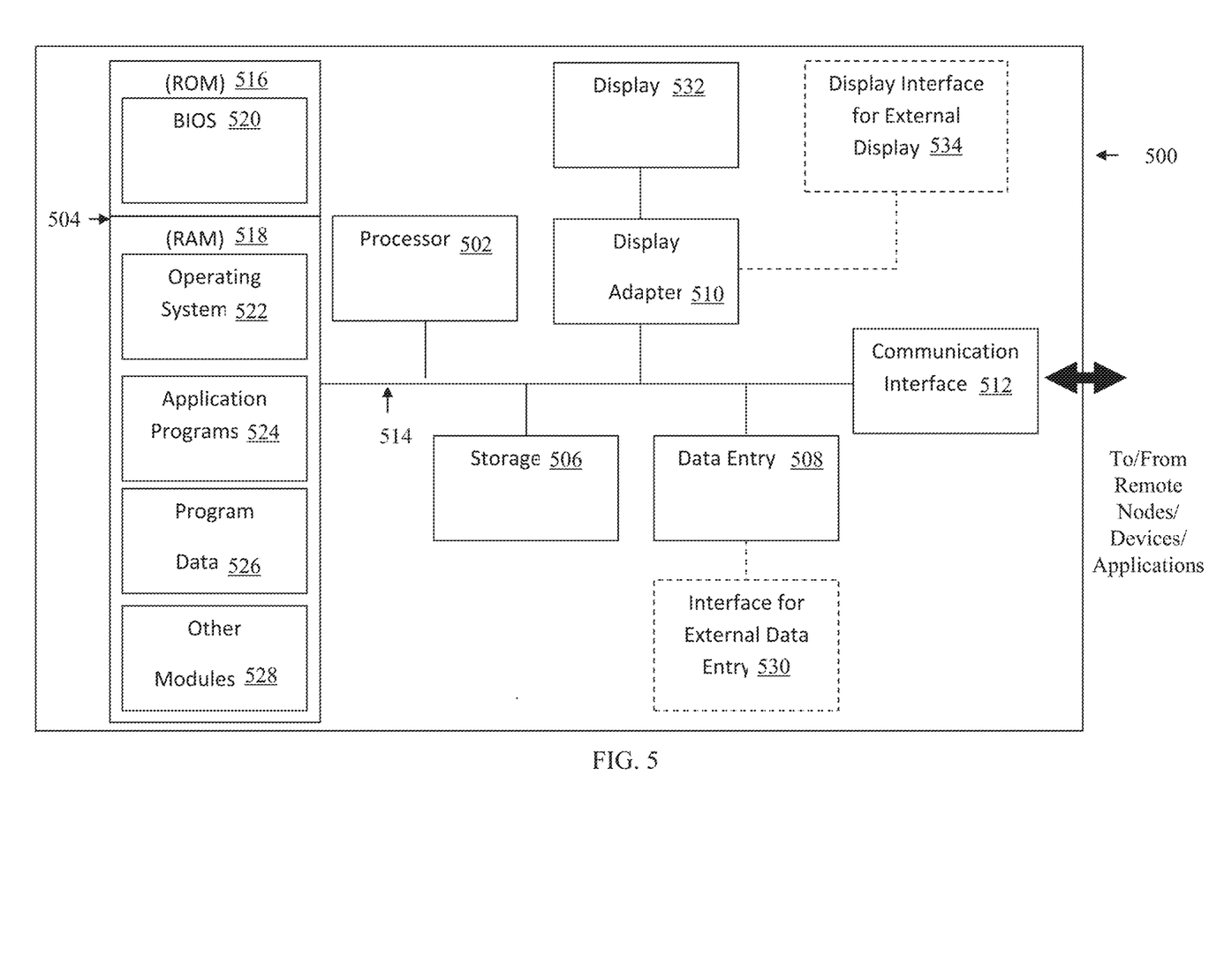
FIG. 5 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 5 may vary depending on the system implementation. With reference to FIG. 5, an exemplary system for implementing the subject matter disclosed herein includes a hardware device 500, including a processing unit 502, memory 504, storage 506, a data entry module 508, a display adapter 510, a communication interface 512, and a bus 514 that couples the elements 504-512 to the processing unit 502.

The bus 514 may comprise any type of bus architecture. Examples include a memory bus, a peripheral bus, a local bus, etc. The processing unit 502 is an instruction execution machine, apparatus, or device and may comprise a microprocessor, a digital signal processor, a graphics processing unit, an application specific integrated circuit (ASIC), a field programmable gate array (FPGA), etc. The processing unit 502 may be configured to execute program instructions stored in the memory 504 and/or the storage 506 and/or received via the data entry module 508.

The memory 504 may include read only memory (ROM) 516 and random access memory (RAM) 518. The memory 504 may be configured to store program instructions and data during operation of the hardware device 500. In various embodiments, the memory 504 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 504 may also include nonvolatile memory technologies such as nonvolatile flash RAM (NVRAM) or ROM. In some embodiments, it is contemplated that the memory 504 may include a combination of technologies such as the foregoing, as well as other technologies not specifically mentioned. When the subject matter is implemented in a computer system, a basic input/output system (BIOS) 520, containing the basic routines that help to transfer information between elements within the computer system, such as during start-up, is stored in the ROM 516.

The storage 506 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 500.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 506, the ROM 516 or the RAM 518, including an operating system 522, one or more applications programs 524, program data 526, and other program modules 528. A user may enter commands and information into the hardware device 500 through the data entry module 508. The data entry module 508 may include mechanisms such as a keyboard, a touch screen, a pointing device, etc. Other external input devices (not shown) are connected to the hardware device 500 via an external data entry interface 530. By way of example and not limitation, external input devices may include a microphone, joystick, game pad, satellite dish, scanner, or the like. In some embodiments, external input devices may include video or audio input devices such as a video camera, a still camera, etc. The data entry module 508 may be configured to receive input from one or more users of the hardware device 500 and to deliver such input to the processing unit 502 and/or the memory 504 via the bus 514.

A display 532 is also connected to the bus 514 via the display adapter 510. The display 532 may be configured to display output of the hardware device 500 to one or more users. In some embodiments, a given device such as a touch screen, for example, may function as both the data entry module 508 and the display 532. External display devices may also be connected to the bus 514 via an external display interface 534. Other peripheral output devices, not shown, such as speakers and printers, may be connected to the hardware device 500.

The hardware device 500 may operate in a networked environment using logical connections to one or more remote nodes (not shown) via the communication interface 512. The remote node may be another computer, a server, a router, a peer device or other common network node, and typically includes many or all of the elements described above relative to the hardware device 500. The communication interface 512 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 512 may include logic configured to support direct memory access (DMA) transfers between the memory 504 and other devices.

In a networked environment, program modules depicted relative to the hardware device 500, or portions thereof, may be stored in a remote storage device, such as, for example, on a server. It will be appreciated that other hardware and/or software to establish a communications link between the hardware device 500 and other devices may be used.

It should be understood that the arrangement of the hardware device 500 illustrated in FIG. 5 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 500.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 5.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for backup file recovery from multiple data sources, the system comprising:
a processor-based application, which when executed on a computer, will cause a processor to:
determine, in response to receiving a request to recover a backup file associated with a data object, whether each data source of a plurality of data sources stores an entire copy of the backup file associated with the data object;
allocate, in response to a determination that each data source of the plurality of data sources stores the entire copy of the backup file associated with the data object, an amount of the backup file requested to be recovered to each data stream of a plurality of data streams, the plurality of data streams equaling the plurality of data sources, each of the data streams transmitting the corresponding allocated amount of the backup file from a different one of the plurality of data sources;
recover the allocated backup file by concurrently recovering the corresponding plurality of data streams from the corresponding plurality of data sources; and
recover the backup file from a single data source of the plurality of data sources in response to a determination that each of the data sources of the plurality number of data sources stores less than the entire copy of the backup file associated with the data object.

2. The system of claim 1, wherein the backup file comprises one of a plurality of data files and a plurality of data blocks.

3. The system of claim 1, wherein determining the plural number of data sources that each store the entire copy of the backup file associated with the data object comprises reading a backup catalog associated with a backup application that created the backup file.

4. The system of claim 1, wherein allocating the corresponding plural number of data streams comprises allocating a first part in a sequence of different portions of the entire copy of the backup file to a first data stream, allocating a second part in the sequence of different portions of the entire copy of the backup file to a second data stream, allocating a third part in the sequence of different portions of the entire copy of the backup file to the first data stream, and allocating a fourth part in the sequence of different portions of the entire copy of the backup file to the second data stream.

5. The system of claim 1, wherein allocating the corresponding plural number of data streams comprises allocating a largest part in a descending size order of different portions of the entire copy of the backup file to a first data stream, allocating a next largest part in the descending size order of different portions of the entire copy of the backup file to a second data stream, and allocating a smallest part in the descending size order of different portions of the entire copy of the backup file to one of the first data stream and the second data stream.

6. A computer-implemented method for backup file recovery from multiple data sources, the method comprising:
determining, in response to receiving a request to recover a backup file associated with a data object, whether each data source of a plurality of data sources stores an entire copy of the backup file associated with the data object;
allocating, in response to a determination that each data source of the plurality of data sources stores the entire copy of the backup file associated with the data object, an amount of the backup file requested to be recovered to each data stream of a plurality of data streams, the plurality of data streams equaling the plurality of data sources, each of the data streams transmitting the corresponding allocated amount of the backup file from a different one of the plurality of data sources;

recovering the allocated backup file by concurrently recovering the corresponding plurality of data streams from the corresponding plurality of data sources; and recovering the backup file from a single data source of the plurality of data sources in response to a determination that each of the data sources of the plurality number of data sources stores less than the entire copy of the backup file associated with the data object.

7. The method of claim 6, wherein the backup file comprises one of a plurality of data files and a plurality of data blocks.

8. The method of claim 6, wherein determining the plural number of data sources that each store the entire copy of the backup file associated with the data object comprises reading a backup catalog associated with a backup application that created the backup file.

9. The method of claim 6, wherein allocating the corresponding plural number of data streams comprises allocating a first part in a sequence of different portions of the entire copy of the backup file to a first data stream, allocating a second part in the sequence of different portions of the entire copy of backup file to a second data stream, allocating a third part in the sequence of different portions of the entire copy of the backup file to the first data stream, and allocating a fourth part in the sequence of different portions of the entire copy of the backup file to the second data stream.

10. The method of claim 6, wherein allocating the corresponding plural number of data streams comprises allocating a largest part in a descending size order of different portions of the entire copy of the backup file to a first data stream, allocating a next largest part in the descending size order of different portions of the entire copy of the backup file to a second data stream, and allocating a smallest part in the descending size order of different portions of the entire copy of the backup file to one of the first data stream and the second data stream.

11. A computer program product, comprising a non-transitory computer-readable medium having a computer-readable program code embodied therein to be executed by one or more processors, the program code including instructions to:

determine, in response to receiving a request to recover a backup file associated with a data object, whether each data source of a plurality of data sources stores an entire copy of the backup file associated with the data object;

allocate, in response to a determination that each data source of the plurality of data sources stores the entire copy of the backup file associated with the data object, an amount of the backup file requested to be recovered to each data stream of a plurality of data streams, the plurality of data streams equaling the plurality of data sources, each of the data streams transmitting the corresponding allocated amount of the backup file from a different one of the plurality of data sources;

recover the allocated backup file by concurrently recovering the corresponding plurality of data streams from the corresponding plurality of data sources; and recover the backup file from a single data source of the plurality of data sources in response to a determination that each of the data sources of the plurality number of data sources stores less than the entire copy of the backup file associated with the data object.

12. The computer program product of claim 11, wherein the backup file comprises one of a plurality of data files and a plurality of data blocks.

13. The computer program product of claim 11, wherein determining the plural number of data sources that each store the entire copy of the backup file associated with the data object comprises reading a backup catalog associated with a backup application that created the backup file.

14. The computer program product of claim 11, wherein allocating the corresponding plural number of data streams comprises allocating a first part in a sequence of different portions of the entire copy of the backup file to a first data stream, allocating a second part in the sequence of different portions of the entire copy of the backup file to a second data stream, allocating a third part in the sequence of different portions of the entire copy of the backup file to the first data stream, and allocating a fourth part in the sequence of different portions of the entire copy of the backup file to the second data stream.

15. The computer program product of claim 11, wherein allocating the corresponding plural number of data streams comprises allocating a largest part in a descending size order of different portions of the entire copy of the backup file to a first data stream, allocating a next largest part in the descending size order of different portions of the entire copy of the backup file to a second data stream, and allocating a smallest part in the descending size order of different portions of the entire copy of the backup file to one of the first data stream and the second data stream.

* * * * *